United States Patent Office 3,553,071
Patented Jan. 5, 1971

3,553,071
NOVEL PRINTING SHEET MATERIAL
John A. Willett, Wellesley, Mass., assignor to W. R. Grace & Co., Cambridge, Mass., a corporation of Connecticut
Filed Aug. 19, 1966, Ser. No. 573,636
Int. Cl. B29c *19/04;* B32b *27/08*
U.S. Cl. 161—162         7 Claims

ABSTRACT OF THE DISCLOSURE

A printing plate blank having a differential dielectric loss factor through its thickness may be formed into a printing plate by dielectric heating so that the high dielectric loss zone melts and is molded to the type form while the low dielectric loss zone remains dimensionally stable. A grinding layer may be applied to the side opposite the printing face to enable precise grinding of the plate to correct dimensions.

---

Figure 1:
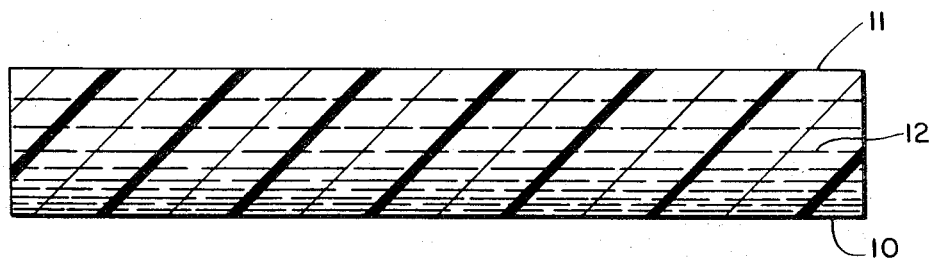

This invention relates to a novel sheet material, process for its manufacture, and its conversion into useful articles.

Although the material and method may be used to produce a wide variety of useful articles, the invention is particularly adapted for use in the manufacture of printing plates and shall be described as related to the printing plate field.

Various compositions are known for use in the molding art including such for use in the printing plate industry. For example, natural and synthetic rubber have been used for these purposes. These materials, however, must be cured or vulcanized by means of heat and pressure. Additionally, the materials suffer from the disadvantage of curing during shelf life whereby they become useless as plate-making material. This self-curing process is diminished by storing under refrigeration. However, this is undesirable in placing limitations on material handling and requiring the undesirable cold storage facilities.

A chief shortcoming is the length of time required to mold a printing plate. The average vulcanizing or curing time is of the order of 12 minutes under heat and pressure. Because of the amount of pressure required to distribute the material during the molding process, very heavy and powerful presses must be employed.

Attempts have been made to overcome the above and other disadvantages of the rubber plates by the use of plastic materials employed in liquid, paste or granular form. While the plastic materials have been to some advantage over the rubber materials in that they offer good resistance to most solvents and oils and have a good affinity for printing inks as well as the desirable features of longer plate life, they still suffer considerable disadvantage in molding qualities. In general, the materials known to date still require approximately the same processing time for molding as necessary with rubber printing plates.

The above and other disadvantages of the previously known methods for producing printing plates and materials used therefor will be evident to those skilled in the art.

Accordingly, it is an object of this invention to provide a novel material particularly adapted for use as a printing plate. A specific object is the provision of a thermoplastic material having a differential dielectric loss factor from one face to the other which is especially suitable as a printing plate material. Another object is to provide a novel process for the production of such materials. These and other objects will be evident as the discussion proceeds.

It has now been discovered that a thermoplastic material having a differential dielectric loss factor from one face to the other is imminently suited for molding to produce a molded surface, especially a printing plate. In one embodiment, the thermoplastic sheet material comprises a layer or zone of thermoplastic material uniformly loaded with a conductive material on top of a layer or zone of thermoplastic material essentially devoid of a conductive material or containing a different conductive material so that a differential dielectric loss factor exists between the two outer surfaces of the resulting composite. A specific embodiment comprises a layer or zone of carbon-loaded polyvinyl chloride film superimposed on a polyvinyl chloride film which is essentially devoid of or contains a different dielectric material which in turn is superimposed on a layer or zone comprising polyvinyl chloride film having finely-divided grit material, especially sand, uniformly dispersed therein. Other embodiments will be evident as the discussion proceeds.

The novel products are of special advantage in that they can be molded in a more facile manner, e.g., a molding time of less than 1 minute, and fineness of characters such as that required in the printing plate industry is readily achieved with the characters being capable of a larger number of impressions than obtainable heretofore while still producing excellent printing. These and other advantages of the novel products are further brought out hereinafter.

Figure 2:
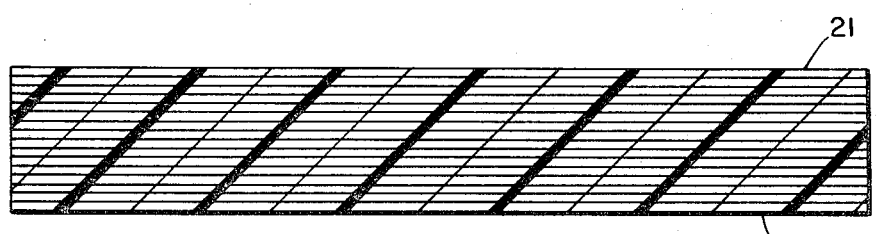
Figure 3:
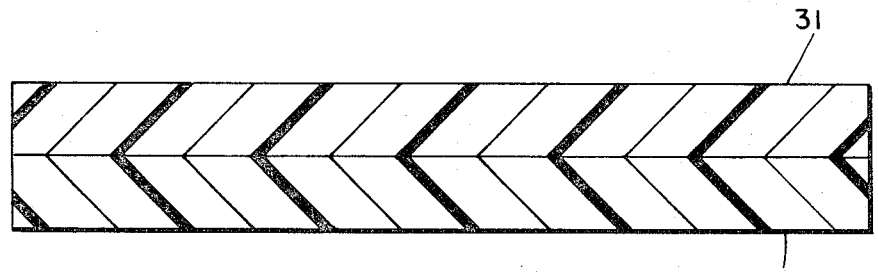
Figure 4:
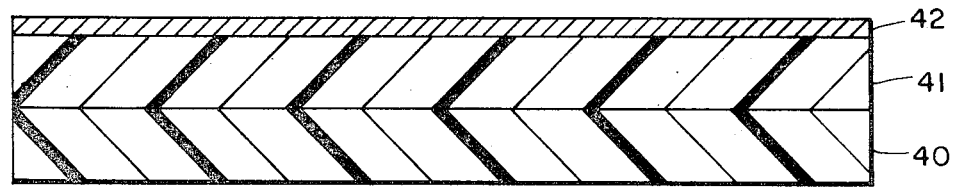

In order that the novel products will be better understood and for illustrative purposes, reference is made to the accompanying drawings in which FIGS 1 to 3 are cross-sections of typical thermoplastic sheet materials illustrating a gradient in dielectric loss factor from one surface to the other and FIG. 4 is a cross-section of a particular embodiment of the invention of a material having a differential in dielectric loss factor as well as a grinding surface.

Turning to FIG. 1, there is illustrated one embodiment which comprises a molding face 10 and a support face 11 in which finely-divided radio frequency energy-absorbing agent or material, e.g., carbon, is suspended in a gradient fashion with the highest concentration being at the molding face and the concentration decreasing toward the support face. This structure is prepared typically by using a conventional vinyl resin plastisol to which is added from about 10 to 50%, based on the weight of the resin, of finely-divided energy-absorbing material. The energy-absorbing material is held in suspension as discreet particles and, as the dispersion is laid down, cast, extruded, or coated and while still in the fluid state, it is subjected to a field of vibration or an electrostatic field through the sheet from the molding face 10. This causes the particles of suspended energy-absorbing material to migrate in the direction of the molding face 10. After the proper amount of the above treatment, the sheet is fused in the well known manner and the resulting product is the thermoplastic composition sheet having a gradient in dielectric loss factor diminishing from the molding face 10 toward the support zone 11 as illustrated by the dotted line 12.

Turning to FIG. 2, there is shown another embodiment of sheet material having a gradient loss factor from the molding face 20 to the support face 21. Typically, individual sheets of thermoplastic material are preformed, each of which has different amounts of energy-absorbing material, from plastisol, organisols, or extruded thermoplastic sheet materials by known techniques. Then a series of the sheets of the polymeric composition are laminated to obtain the desired thickness. Starting with the molding face 20, the formulation of each succeeding sheet contains a lesser amount of energy-absorbing material with the back of the laminate, 21, preferably containing essentially no energy-absorbing material. Thus a gradient dielectric loss factor is inherent in the finished laminate. The individual layers can be adhesively secured to each other or may be secured by an appropriate means for use in the molding operation.

Turning to FIG. 3, one preferred embodiment is illustrated which comprises two separate zones of thermoplastic material. In this embodiment the molding face 30 is a separate sheet or zone and contains the required amount of energy-absorbing material. The support face 31 is a separate sheet or zone of thermoplastic material which can be the same or different from the thermoplastic used in the molding face but the composition contains no energy-absorbing material. Again, the individual sheets or zones can be obtained by conventional means such as extrusion, casting, or molding. Likewise the preformed sheets can be laminated to each other by means of an adhesive or molding under heat and pressure. In a particular embodiment especially adapted to the printing industry, the molding face sheet 30 is placed in contact with the die or matrix, and the support face sheet 31 is placed on top of the molding face sheet. When heat and pressure are applied especially by the method referred to hereinafter, the molding face sheet will become molten while the support face sheet will remain virtually unaffected. Upon subsequent chilling, the two sheets will be bonded into a single sheet, thereby producing a thermoplastic material of nonlinear dielectric loss characteristics.

Turning to FIG. 4, this represents another preferred embodiment of the invention. There is shown a molding face zone 40 having energy-absorbing material uniformly dispersed throughout, a supporting layer 41 which is essentially devoid of any energy-absorbing material, and a grinding surface layer 42 which is also essentially devoid of energy-absorbing material but contains finely-divided grit or abrasive material such as sand uniformly dispersed throughout. The construction illustrated in FIG. 4 may be achieved in a number of different ways as will be evident to those skilled in the art, but the following is illustrative of a technique used.

The molding face layer 40 was a typical commercial plastisol formulation comprising basically a dispersion of polyvinyl chloride resin in plasticizer. To the stock commercial formulation was added and thoroughly mixed an energy-absorbing agent in the form of finely divided elemental carbon, 20% by weight based on the weight of the resin. The plastisol was poured into a sheet-making mold of 7 inches by 11 inches dimensions. The plastisol was then gelled by heating to 325° F. for 2 minutes. Next a similar plastisol composition, but absent the carbon or any energy-absorbing agent, was poured into the same mold on top of the previously gelled film to a thickness of 0.11 inch. The mold was then placed in an oven and the second layer gelled in the same manner. Finally, a separate blend of the same polyvinyl chloride plastisol containing 12% by weight of finely-divided sand throughly mixed therein was poured on top of the foregoing support layer to a thickness of 0.010 inch. The mold was then again placed in an oven to flux the top layer under the same conditions described above. In this manner structure number 4 was obtained, ready for use in molding a printing plate.

The printing plate is generally formed by the usual techniques of heat and pressure molding. However, the novel products of this invention are especially adapted to and advantageous in a molding procedure involving dielectric heating. Typically, a radio frequency molding apparatus of the type well known to the art is employed with the die or matrix, along with the workpiece placed between the platens. A frequency of 2 to 200 megacycles is generally employed for periods less than 1 minute, preferably between 5 and 15 seconds, with only a very slight pressure applied to the workpiece with stops positioned to accomplish the desired thickness of the molded material as well as complete formation of the impressions.

An especially unique and preferred method for molding the novel printing plates of this invention also involves radio frequency heating but of a unique type forming a part of this invention. Briefly, a thermoplastic sheet material prepared as described above, especially from the plastisol form, is placed in a radio frequency mold, a vacuum is created surrounding the sheet, and the platens of the mold are continuously cooled throughout the operation. The radio frequency is applied for the time designated above, and the workpiece is molded while maintaining the vacuum and cooling the platens. The vacuum is very important since it eliminates air from the workpiece, creates a vacuum in the space between the characters to draw the molten plastic into the cavity, reduces the pressure needed during the molding operation, and eliminates "gas-out" of the plastic. In a more specific embodiment of this method, the platens of the dielectric mold are continuously moved toward each other to form a vacuum seal on a resilient surface, while simultaneously drawing a vaccum, continuing the movement of the platens until the workpiece is just in contact with the upper platen and holding the platen at contact by essentially 0 pressure, instantaneously actuating the radio frequency current and maintaining such for about 10 seconds thereby rendering the molding face molten, discontinuing the current, then actuating the platens to move closer together until a predetermined thickness is obtained. It is important and preferably to avoid further compression of the molding material while the radio frequency current is being applied since such will reduce the thickness of the film, thereby reducing its dielectric strength which can result in undesirable arcing. This method and apparatus therefor are more particularly described in my copending application filed of even date herewith, the disclosure of which is incorporated herein.

A unique feature of the products and their employment in the above described radio frequency molding technique is that the molding surface becomes molten whereas the support surface generally does not and maintains dimensional stability. Moreover, plates made in the above-described manner using the novel products result in a higher degree of accuracy of impressions producing better printed products.

While the above discussion has been confined primarily to vinyl type thermoplastics, it is to be understood that any thermoplastic which can be cast, extruded, coated, or otherwise made into sheet form can be employed. Likewise, such materials can be further formulated as its typically done and known in the industry with plasticizers, fillers, antioxidants, curing agents, and the like in varying amounts for easier processing and variation with respect to physical properties, especially hardness, solvent resistance, dimensional stability and tensile. As brought-forth above, the basic requirement of the novel thermoplastic sheet materials is that they have a differential dielectric loss factor from one face to the other established by the incorporation of energy-absorbing materials in varying concentration from the one face to the other.

The amount of heat developed in the molding surface face when heated dielectrically depends upon various factors, for example, the composition and physical characteristics of the material, the voltage placed across the material, the frequency of the alternating voltage, the time the voltage is applied, and the rate of heat loss. In order to accomplish these purposes, many heat energy-absorbing materials can be selected. Typical among such are finely-divided carbon, silica aerogels, pyrogenic aluminum oxides, meltable amides such as oxamide or melamine, dye stuffs, and organic pigments. For best results in the printing field, carbon black is particularly preferred of a particle size below 470 millimicrons as measured on an electron microscope. A particularly well suited carbon black is thermal furnace carbon blacks measuring between about 470 and 400 millimicrons on the electron microscope which have an oil absorption value of about 35% by weight of the carbon.

The amount of energy-absorbing material can be varied but in general is between about 1.0 and 50% of weight of the resin or thermoplastic polymer in the molding face and less than about 2% by weight in the support face, or, if used, grinding face. In a particularly preferred embodiment between about 10 to 20% of energy-absorbing material is incorporated and uniformly distributed in the molding surface layer or zone and the support layer and grinding layer, if employed, are essentially devoid of energy-absorbing material. The thickness of the molding surface can be varied as needed but, in general, is of the order of 0.050 inch. All that is required is that enough material be available to fill the depressions of the female image in the mold or matrix.

To further illustrate the compositions used in making the novel products of this invention in the manner described above, especially those depicted in FIGS. 3 and 4, the following table is presented in which all parts are by weight, and the ingredients are uniformly dispersed throughout the formulations in use.

MOLDING SURFACE LAYER

Formula 1

| | |
|---|---|
| Polyvinylchloride-paste grade | 100 |
| Polyester plasticizer | 50 |
| Curing agent | 10 |
| Carbon black | 10 |

Formula 2

| | |
|---|---|
| Polyvinyl chloride-paste grade | 100 |
| Polyester plasticizer | 80 |
| Curing agent | 10 |
| Carbon black | 10 |

Formula 3

| | |
|---|---|
| Polyvinyl chloride-paste grade | 100 |
| Dioctylphthalate | 100 |
| Curing agent | 10 |
| Carbon black | 15 |

SUPPORT LAYER

Formula 4

| | Parts |
|---|---|
| Polyvinyl chloride-paste grade | 100 |
| Polyester plasticizer | 100 |
| Curing agent | 10 |
| TiO$_2$ pigment and Whiting | 8 |

Formula 5

Formula 1 omitting carbon black.

Formula 6

Formula 2 omitting carbon black.

Formula 7

Formula 3 omitting carbon black.

GRINDING SURFACE LAYER

Formula 4 through 7 with 10 to 15 parts finely divided sand added.

Again, the above are presented by way of illustration and other compositions will now be evident to those skilled in the art.

To further illustrate the advantages of the present invention, a printing plate was formed employing Formula 2 as the molding surface and Formula 4 as the support layer employing the illustrative technique described above, excluding the sand-filled layer, and molding the plate by the previously described, preferred method for molding involving radio frequency heating. The printing plate so formed was compared to a conventional Buna-N rubber plate under identical conditions. It was found the novel printing plate material of this invention surpassed the rubber plate in plate life.

Having thus described the novel products and process of this invention, it is not intended that it be limited except as set forth in the following claims.

What is claimed is:

1. A thermoplastic sheet material suitable for use as a printing plate blank consisting essentially of a carbon-loaded polyvinyl chloride zone, an intermediate polyvinyl chloride zone essentially devoid of any radio frequency energy-absorbing material, and a grinding surface comprising a zone of polyvinyl chloride also devoid of radio frequency energy-absorbing material and having a finely-divided abrasive uniformly dispersed therein to permit dielectric heating of the carbon-loaded zone to a molten state while the other zones are maintained in a dimensionally stable state.

2. A prining plate blank for dielectric heating and molding consisting essentially of; a moldable impressionable thermoplastic layer having a molding face and filled from 10–50% based on the weight of the thermoplastic with a uniformly dispersed radio frequency energy-absorbing material for increasing the dielectric loss factor of the layer; and adherent to the impressionable layer opposite the molding face, a support layer of a similar thermoplastic, effectively devoid of radio frequency energy-absorbing material having an effectively lower dielectric loss factor than the impressionable layer to permit dielectric heating of the impressionable layer to a molten state while the support layer is maintained in a dimensionally stable state, and wherein the support layer has on its face opposite the impressionable layer a grinding surface layer having finely-divided grit material uniformly dispersed therein and similarly devoid of radio frequency energy-absorbing material.

3. The printing plate blank of claim 2 wherein the thermoplastic is polyvinyl chloride and the energy-absorbing material in the impressionable layer is carbon black of a particle size below about 470 millimicrons as measured on an electron microscope.

4. The printing plate of claim 3 wherein the carbon black is present in the range of about 10–20% and is thermal furnace carbon black measuring between about 470 and 400 millimicrons on an electron microscope and having an oil absorption value of about 35% by weight of the carbon.

5. The printing plate of claim 2 wherein the impressionable layer consists essentially of 100 parts of polyvinyl chloride; a plasticizer selected from the group consisting of 50–80 parts polyester plasticizer and 100 parts dioctylphthalate; 10 parts of a curing agent; and 10–15 parts by weight of carbon black as the energy-absorbing material; and the support layer consists essentially of the same composition except that it is devoid of the carbon black constituent.

6. A printing plate formed by dielectric heating and molding consisting essentially of a molded impression bearing thermoplastic layer filled from 10–50% based on the weight of the thermoplastic with a radio frequency energy-absorbing material for increasing the dielectric loss factor of the layer and adhered to the impression bearing layer opposite the impression bearing side a thermoplastic support layer essentially devoid of radio frequency energy-absorbing material and having a substantially lower dielectric loss factor than the impression bearing layer, and wherein the plate is formed by a single dielectric heating of the composited low dielectric loss factor support layer and the high dielectric loss factor impression bearing layer to melt the impression bearing layer while the support layer is maintained in a dimensionally stable state.

7. The printing plate of claim 6 wherein the energy-absorbing material is carbon black.

References Cited

UNITED STATES PATENTS

| | | | |
|---|---|---|---|
| 662,862 | 11/1900 | Hett | 161—401 |
| 2,638,460 | 5/1953 | Crouch | 161—401 |
| 2,741,297 | 4/1956 | Vamvaketis | 161—401X |
| 2,792,322 | 5/1957 | Fredericks | 161—254X |
| 3,046,179 | 7/1962 | Stallard | 156—273X |
| 3,063,884 | 11/1962 | Glover et al. | 161—254X |
| 3,126,307 | 3/1964 | Drittenbass | 156—273 |
| 3,146,141 | 8/1964 | Woodland | 156—273X |

FOREIGN PATENTS

| | | | |
|---|---|---|---|
| 812,458 | 4/1959 | Great Britain | 161—254 |
| 587,383 | 11/1959 | Canada | 156—273 |

JOHN T. GOOLKASIAN, Primary Examiner

C. B. COSBY, Assistant Examiner

U.S. Cl. X.R.

101—401.1; 156—273; 161—254